United States Patent
Otacioglu et al.

(10) Patent No.: US 10,427,607 B2
(45) Date of Patent: Oct. 1, 2019

(54) HORIZONTAL RETRACTABLE RUNNING BOARD WITH HIGH LOAD CAPACITY

(71) Applicant: BIRINCI OTOMOTIV SANAYI VE TICARET ANONIM SIRKETI, Kocaeli (TR)

(72) Inventors: Cihat Otacioglu, Kocaeli (TR); Hakan Aydin, Kocaeli (TR); Mehmet Balaban, Kocaeli (TR); Vedat Korap, Kocaeli (TR)

(73) Assignee: Birinci Otomotiv Sanayi Ve Ticaret Anomin Sirketi, Kocaeli (TR)

(*) Notice: Subject to any disclaimer, the term of this patent is extended or adjusted under 35 U.S.C. 154(b) by 0 days.

(21) Appl. No.: 16/091,615

(22) PCT Filed: Jan. 27, 2017

(86) PCT No.: PCT/TR2017/050043
§ 371 (c)(1),
(2) Date: Oct. 5, 2018

(87) PCT Pub. No.: WO2017/176226
PCT Pub. Date: Oct. 12, 2017

(65) Prior Publication Data
US 2019/0118720 A1    Apr. 25, 2019

(30) Foreign Application Priority Data

Apr. 7, 2016   (TR) .............................. a 2016 04537

(51) Int. Cl.
*B60R 3/00* (2006.01)
*B60R 3/02* (2006.01)

(52) U.S. Cl.
CPC ................ *B60R 3/02* (2013.01); *B60R 3/002* (2013.01)

(58) Field of Classification Search
CPC .................................. B60R 3/02; B60R 3/002
See application file for complete search history.

(56) References Cited

U.S. PATENT DOCUMENTS 4,116,457 A * 9/1978 Nerem ...................... B60R 3/02
                                                              280/166
6,955,370 B2   10/2005 Fabiano et al.
(Continued)

FOREIGN PATENT DOCUMENTS

EP       1 154 912 A1   11/2001
TR       200804918 U    10/2008
(Continued)

OTHER PUBLICATIONS

ISR_for_for_International_Application_No_PCTTR2017050043.
(Continued)

*Primary Examiner* — Hau V Phan
(74) *Attorney, Agent, or Firm* — Ladas & Parry LLP

(57) ABSTRACT

A retractable running board (A) comprising at least one supplementary step that facilitates getting in/out of a vehicle (B) for the passengers, e.g. in vehicles (B) with high ground clearance, at least one driving member supplying the driving force required by the system, at least one drive shaft, at least two flanges in at least one of which said driving shaft is embedded, at least two levers that are engaged with said flanges and capable of performing rotational movement in y axis (y) perpendicular to the ground upon being actuated by the drive shaft, at least one intermediate lever, and at least two step brackets which are secured in said supplementary step and which, at the other end of the lever which is fixed to the flange, are capable of performing rotational movement in y axis (y) perpendicular to the ground relative to each other.

8 Claims, 3 Drawing Sheets

(56) References Cited

U.S. PATENT DOCUMENTS

Figure 1:
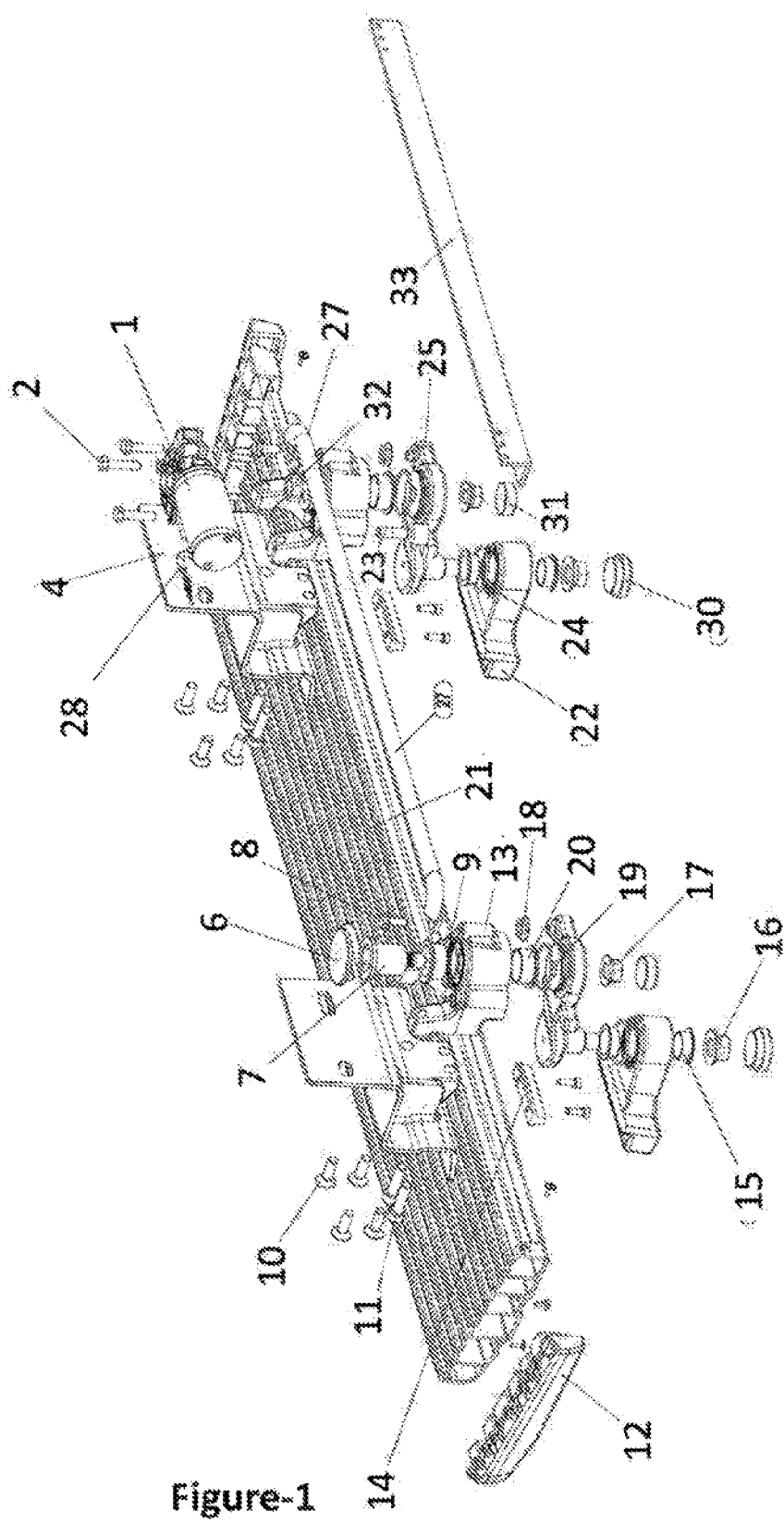

| | | | | |
|---|---|---|---|---|
| 7,118,120 B2* | 10/2006 | Lee | ............... | B60R 3/002 |
| | | | | 280/166 |
| 7,377,531 B2* | 5/2008 | Fabiano | ............... | B60R 3/002 |
| | | | | 182/88 |
| 7,398,985 B2* | 7/2008 | Leitner | ............... | B60R 3/02 |
| | | | | 280/166 |
| 8,262,113 B1* | 9/2012 | Chafey | ............... | B60R 3/02 |
| | | | | 280/163 |
| 8,342,551 B2* | 1/2013 | Watson | ............... | B60R 3/02 |
| | | | | 280/163 |
| 8,668,217 B2* | 3/2014 | Ziaylek | ............... | B60R 3/02 |
| | | | | 280/163 |
| 9,266,475 B2* | 2/2016 | Cha | ............... | B60R 3/002 |
| 2016/0023609 A1 | 1/2016 | Watson | | |

FOREIGN PATENT DOCUMENTS

| | | |
|---|---|---|
| TR | 201001264 A2 | 9/2011 |
| WO | 00/50262 A1 | 8/2000 |

OTHER PUBLICATIONS

Written_Opinion_for_International_Application_No_PCT/TR2017/050043 dated May 12, 2017.
TR 201001264 A2 _ English_Abstract.
TR 200804918 U _ English_Abstract.

\* cited by examiner

HORIZONTAL RETRACTABLE RUNNING BOARD WITH HIGH LOAD CAPACITY

RELATED APPLICATION

This application is a national phase entry under 35 USC 371 of International Patent Application No.: PCT/TR2017/050043 filed on 27 Jan. 2017, which claims priority from TR Application No. 2016/04537 filed on 7 Apr. 2016, the disclosures of which are incorporated in their entirety by reference herein.

TECHNICAL FIELD

The invention relates to retractable running boards which facilitate getting in/out of a vehicle, e.g. vehicles with high ground clearance such as vans, bus, etc. public transportation vehicles for transporting passengers and some passenger cars.

The invention particularly relates to retractable running boards which facilitate getting in/out of a vehicle, e.g. vehicles with high ground clearance such as shuttle-like public transportation vehicles for transporting passengers and some passenger cars; which remain unaffected by the roughness of the road surface owing to the horizontal movement thereof; which act/respond fast by performing a rotational movement; and which, at the same time, have a high load capacity.

BACKGROUND OF THE INVENTION

In the applications today, there exist many movable step-type configurations with various properties that allow getting in/out of vehicles. They differ in terms of working principles. One of them includes the configurations which perform oscillating movement in vertical axis, as disclosed in the Patent No. TR2010/01264 titled "A movable step assembly". The downward oscillating movement performed during opening/closing of the step in such configurations increases the required workspace. This, in turn, is one of the disadvantages of these systems. This is because the step may get damaged or fail to function properly during opening/closing due to stones, bumps, etc. likely to hit the step.

The configurations which oscillate horizontally have been developed as disclosed in the utility model No. TR2008/04918 in the background of the invention, in order to overcome the drawbacks of vertically oscillating configurations. Although hitting-related problems are prevented by these systems, they have other disadvantages. One of these disadvantages is the long period of time required for opening/closing of these vertically moving systems. And this may cause traffic congestion and inconveniences while dropping off and picking up the passengers. Apart from that, a larger area is needed for mounting in the vehicle in horizontal steps with vertical movement and the load capacity is directly proportional thereto. In such a step, the maximum amount of load that can be carried must be sufficient by taking the possible maximum passenger weight and a certain safety coefficient into consideration.

The Patent Application No. TR2008/04918 discloses retractable steps performing horizontal oscillation (without moving vertically); however, these are disadvantageous in that unwanted external factors such as mud, dirt get stuck in the moving mechanism of the step. In these models, the running clearance between the step moving out and the stationary body is approximately 2-3 mm, which is quite low for an operating distance.

As a result, the need for retractable running boards which facilitate getting in/out of a vehicle, e.g. vehicles with high ground clearance such as shuttle-like public transportation vehicles for transporting passengers and some passenger cars; which remain unaffected by the roughness of the road surface owing to the horizontal movement thereof; which act/respond fast by performing a rotational movement; and which, at the same time, have a high load capacity, as well as the insufficiency of the existing solutions, has deemed it necessary to make a development in the related technical field.

OBJECT OF THE INVENTION

The present invention relates to a retractable running boards which meets the aforementioned requirements, eliminates the drawbacks, and at the same time provides additional advantages.

The primary object of the retractable running board according to the invention is to provide a supplementary step facilitating getting in/out of the vehicle for the passengers such that it will move in horizontal plane and emerge under the vehicle door. Thus, the risks including stones, bumps, pavements, projections on the road surface resulting from the roughness, etc. which are likely to hit the step during opening/closing movement of said step are eliminated. Any distance that the vehicle can move is enough for the step to perform opening/closing movement. The reason for this is that there is no need, unlike the background of the invention, for an additional space in the vertical plane for opening/closing movement, and that the moving mechanism is designed accordingly.

The present running board has a modular structure. The size of the step may vary according to the need and model of the vehicle, without making changes in the distance between connection points.

Another object of the invention is to enable the supplementary step to be actuated faster by allowing the movement thereof in the horizontal plane by means of at least two levers with rotational movement. Hence, the time needed for getting in/out of the vehicle will be shortened, and thus the passengers will not have to wait. This is advantageous in terms of the traffic. Moreover, the rotational movement necessitates less mounting area under the vehicle while at the same time having a higher load capacity. The step according to the invention is capable of carrying a load of 270 kg. There might be permanent deformation under the limit value (max 1.5 mm) determined in regulations with a load of 270 kg performed by means of a design and analysis program. The former value is quite safe. Thus, a very high level of safety measure has been taken in terms of strength.

Another object of the invention is to enlarge the stepping area for the passengers which is of a large size. In this way, it will be easier for the passengers to maintain their balance since the difficulty in setting foot on the step in narrow steps has been eliminated. This will also prevent the probability of accidents.

The system according to the invention, compared to the Patent Application No. TR2008/04918, has approximately a 10-mm clearance between the stationary body and the moving portion. Said clearance prevents such factors as mud, dust, etc. from being stuck in a way to obstruct the operation of the system. However, the mud and dust passing through clearance may prevent proper operation by accumulating in the cartridge of the TR2008/04918 patent application since there is only 1-2 mm clearance between stationary body and the moving portion.

In order to achieve the aforementioned objects in general, a retractable running board has been developed which facilitates getting in/out of a vehicle, e.g. vehicles with high ground clearance such as shuttle-like public transportation vehicles for transporting passengers and some passenger cars; which remains unaffected by the roughness of the road surface owing to the horizontal movement thereof; which acts/responds fast by performing a rotational movement; and which, at the same time has a high load capacity. The newly developed retractable running board comprises a supplementary step that facilitates getting in/out of a vehicle for the passengers, a driving member supplying the driving force required by the system, a drive shaft transferring the driving force received from the driving member to the system, two flanges in which the drive shaft is embedded and which help the system to be mounted in the vehicle, two levers that are engaged with the flanges and capable of performing rotational movement in perpendicular axis with respect to the ground upon being actuated by the drive shaft, and two step brackets which are fixed on the supplementary step and which are capable of performing rotational movement in perpendicular axis with respect to the ground relative to each other at the other end of the lever which is not fastened to the flange.

The structural and characteristic features and all advantages of the invention will be understood more clearly by referring to the following figures and the detailed description written with reference to these figures; therefore, the figures and the detailed description should be taken into consideration while making an evaluation.

FIGURES FOR A BETTER UNDERSTANDING OF THE INVENTION

The embodiment of the present invention and advantages thereof with the additional components must be considered together with the figures explained below in order to be fully understood.

FIG. 1: The exploded view of the retractable running board according to the invention.

Figure 2:
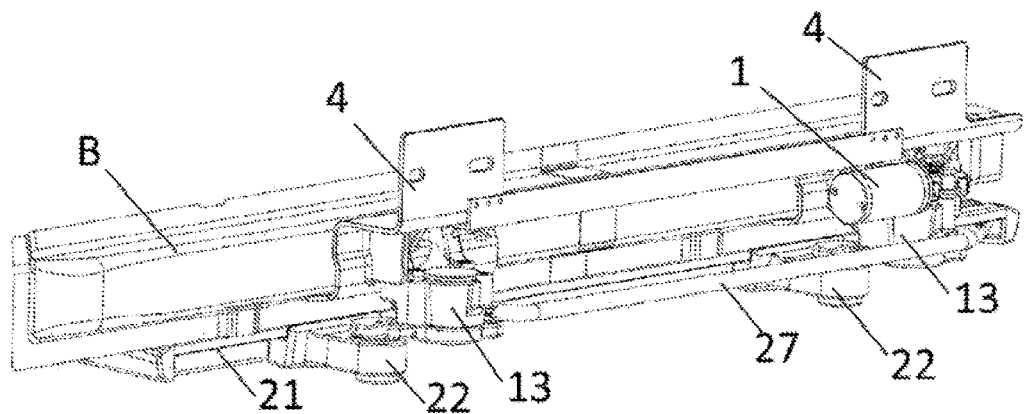

FIG. 2: The rear view of the retractable running board according to the invention in deployed position when mounted in the vehicle.

Figure 3A:
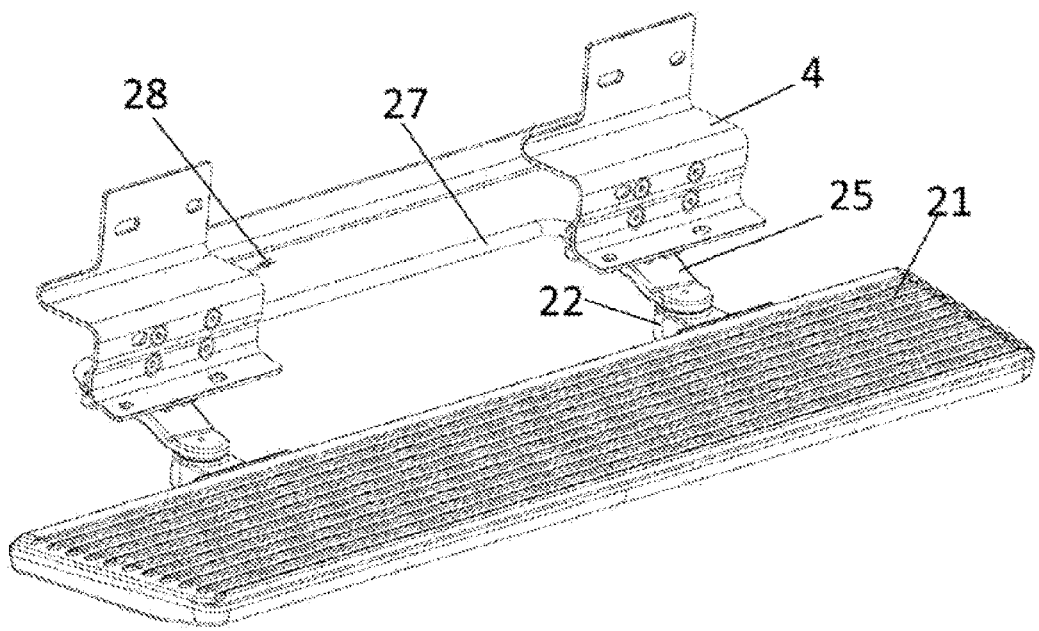

FIG. 3a: The front view of the retractable running board according to the invention in deployed position when it is dismounted.

Figure 3B:
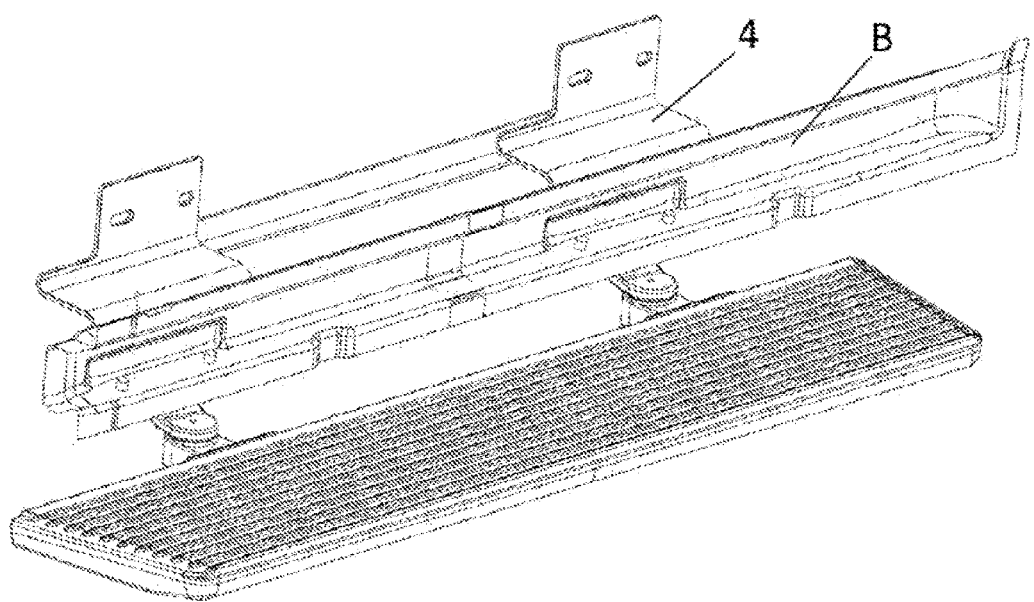

FIG. 3b: The front view of the retractable running board according to the invention in deployed position when mounted in the vehicle.

REFERENCE NUMERALS

A Retractable running board
B Vehicle
1 Driving member
2 Locking bolt for driving member
4 Vehicle mounting bracket
6 Cap
7 Drive shaft
8 Intermediate lever bolt
9 O-ring
10 Countersunk bolt
11 Imbus bolt
12 End head
13 Flange
14 Step fixing nut
15 Lower bushing
16 Lower nut
17 Nut
18 Small bushing
19 O-ring
20 Bushing
21 Supplementary step
22 Step bracket
23 Stopper
24 O-ring
25 Lever
27 Intermediate lever
28 Connection cable
30 Bracket cap
31 Engine cap
32 Engine connecting piece
33 Angle
x Reverse direction in x axis
x' Forward direction in x axis
y y axis

DETAILED DESCRIPTION OF THE INVENTION

The retractable running board (A), the exploded view of which is given in FIG. 1, comprises, unlike the background of the invention, in addition a supplementary step (21) that facilitates getting in/out of a vehicle (B) for the passengers e.g. as in vehicles (B) with high ground clearance such as shuttle-like public transportation vehicles (B) for transporting passengers and some passenger cars: at least one driving member (1) supplying the driving force required by the system, at least one drive shaft (7) transferring the driving force received from the driving member (1) to the system, at least two flanges (13) in at least one of which said driving shaft (7) is embedded and which help the system to be mounted in the vehicle (B), at least two levers (25) that are engaged with the flanges (13) and capable of performing rotational movement in y axis (y) perpendicular to the ground upon being actuated by the drive shaft (7), and at least two step brackets (22) which are fixed on the supplementary step (21) and which are capable of performing rotational movement in y axis (y) perpendicular to the ground relative to each other at the other end of the lever (25) which is not fastened to the flange (13).

In the preferred embodiment, two flanges (13) are connected to the portion of the vehicle (B) remaining under the door by means of vehicle mounting brackets (4), one for each. The vehicle mounting bracket (4), made of aluminum, is advantageous in that it can join together different elements with its L-shaped form. The fixation between the flange (13) and the vehicle mounting bracket (4) is ensured by means of countersunk bolts (10) and imbus bolts (11).

The driving member (1) is preferably engaged with only one of the flanges (13) and it can transmit rotational movement to the drive shaft (7) located in the flange (13). The driving member (1) is fastened to the flange (13) by means of the locking bolt for driving member (2). The upper portion of the flange (13) which is not provided with a driving member (1) is enclosed by a cap (6), thereby being protected against external factors like water, mud, etc. The Ø46×1.5 O-ring (9) seals the cap (6) area On the other hand, the Ø43×2 O-ring (19) seals the lower portion of the flange (13). The 34×2×42 bushing (20) is made of teflon and serves for bearing the lever (25) inside the flange (13). The levers (25) engaged in the flanges (13) from the lower portion are capable of rotational movement in y axis perpendicular to the ground. The spline of the driving shaft (7) allows the lever (25) to be centered with the drive shaft (7) and to be fixed on it. The intermediate lever (27) disposed between the levers (25) ensures synchronization by transferring the motion from one to the other. And this means that a single driving member (1) is sufficient. The element connecting the intermediate lever (27) to the lever (25) is the intermediate lever bolt (8). As the related portion of the lever (25) is threaded, the connection with the intermediate lever bolt (8) can be made without using lever bolts. The M14×2 nut (17) connects the drive shaft (7) to the lever (25). On the other hand, the 12×1×10 small bushing (18) serves as a bearing between the intermediate lever (27) and the lever (25).

The stopper (23) coated with rubber and arranged on the flange (13) hits the lever (25) during rotation, and thus it stops the rotational movement by softening. A step bracket (22) capable of rotational movement in y axis (y) perpendicular to the ground is located on the other end of the lever (25) which is not fasten to the flange (13). The 28×1.5×35 lower bushing (15) serves as a bearing together with the Ø40×2.5 O-ring (24) and the lower nut (16) while mounting the lever (25) in the step bracket (22). The step brackets (22) is fixed with one side of the supplementary step (21) by means of the step fixing nut (14). The end heads (12) which are located at the lateral edges of the supplementary step (21) protect the supplementary step (21) against impacts and at the same time prevent impurity from entering therein. The driving member (1) is connected to the electrical system of the vehicle (B) through the connection cable (28), thereby being supplied with the required power. The system is also provided with a bracket cap (30) located through the lower portion of the step bracket (22) and with an engine cap (31) fixed in the lower portion of the connection axis of said lever (25). On the other hand, the system comprises an engine connecting piece (32) located between said driving member (1) and supplementary step (21), as well as a angle (33) mounted to the vehicle mounting bracket (4). Thanks to the angle (33), the system is made stable prior to mounting, and at the same time the errors emerged from mounting at a faulty distance are eliminated.

FIG. 2 shows the rear view of the retractable running board (A) when mounted in the vehicle (B). FIGS. 3a and 3b show the front views of the system in deployed position when dismounted from the vehicle (B) and when mounted in the vehicle (B), respectively. When the retractable running board (A) is in stowed position, the supplementary step (21) is located under the vehicle (B). The driving member (1) rotates the drive shaft (7) arranged in y axis (y) upon being actuated by the power received through the connection cable (28) during the opening movement of the retractable running board (A). The drive shaft (7) transfers the rotational movement to the lever (25). In the meantime, the movement is also transferred to the other lever (25) within the system by means of the intermediate lever (27). The levers (25) rotating with respect to y axis (y) at one end push the step bracket (22), and hence the supplementary step (21) in forward direction in x axis (x) parallel to the ground. Thus, the supplementary step (21) emerges from under the vehicle (B) and becomes ready to use. When the stopper (23) disposed on the flange (13) rests against the resting points on the lever (25), said movement is stopped. In cases when the supplementary step (21) is needed to be retracted under the vehicle (B), a reverse driving force is applied to the driving member (1), thereby ensuring that the drive shaft (7) performs a reverse rotation to the former one. Afterwards, as in the former operation, the rotational movement is first transferred to the levers (25), and then to the step brackets (22). Thanks to the fact that the step brackets (22) are fixed in the supplementary step (21), the rotational movement is converted into linear movement, thereby retracting the supplementary step (21) in reverse direction in x axis (x) parallel to the ground.

There exist switches on the door which sense said motion when the door is closed and opened. In connection with these switches, the supplementary step (21) is opened/closed automatically. In other words, when closed, the door contacts with the switch and closing movement of the supplementary step (21) is thus initiated, in contrast, when the door is opened, the switch is released and the opening movement of the supplementary step (21) is initiated. If, on the other hand, only half of the opening is performed and the door is closed before the opening is complete, the supplementary step (21) will assume its stowed position without completing the opening, upon contacting with the switch at the closing point of the door.

The invention claimed is:

1. A retractable running board (A) comprising a supplementary step (21) that facilitates getting in/out of a vehicle (B) for the passengers in public transportation vehicles (B) for transporting passengers, passenger cars, and vehicles (B) with high ground clearance; characterized by:
   at least one driving member (1) supplying the driving force required by the system,
   at least one drive shaft (7) transferring the driving force received from the driving member (1) to the system,
   at least two flanges (13) in which the driving shaft (7) is embedded and which assist the system to be mounted in the vehicle (B),
   at least two levers (25) that are engaged with the flanges (13) and capable of performing rotational movement in y axis (y) perpendicular to the ground being actuated by the drive shaft (7),
   step brackets (22) which are fixed on the supplementary step (21) and capable of performing rotational movement in y axis (y) perpendicular to the ground relative to each other at the other end of the lever (25) which is not fasten to the flange (13), and
   an engine connecting piece (32) located between said driving member (1) and supplementary step (21) and an angle (33) mounted to the back surface of the vehicle mounting bracket (4).

2. The retractable running board (A) according to claim 1, comprising at least one intermediate lever (27) which is engaged between the levers (25) and ensures synchronization by transferring movement therebetween, and which is located at a different angle than the connection angle of the supplementary step (21) such that the instability of the two levers (25) at the central position during movement will be prevented.

3. The retractable running board (A) according to claim 1, comprising at least two vehicle mounting brackets (4) connecting the flanges (13) to the vehicle (B).

4. The retractable running board (A) according to claim 1, comprising a cap (6) thereon for protection against external factors such as water, mud, etc. in case the flange (13) is not provided with the driving member (1).

5. The retractable running board (A) according to claim 1, comprising a stopper (23) limiting the rotational movement formed on the flange (13).

6. The retractable running board (A) according to claim 1, comprising a connection cable (28) for supplying the required power to said driving member (1).

7. The retractable running board (A) according to claim 1, comprising a bracket cap (30) located at the lower portion of the step bracket (22).

8. The retractable running board (A) according to claim 1, comprising an engine cap (31) which is fixed on the lower portion of the connection axis of said lever (25).

* * * * *